Figure 1:
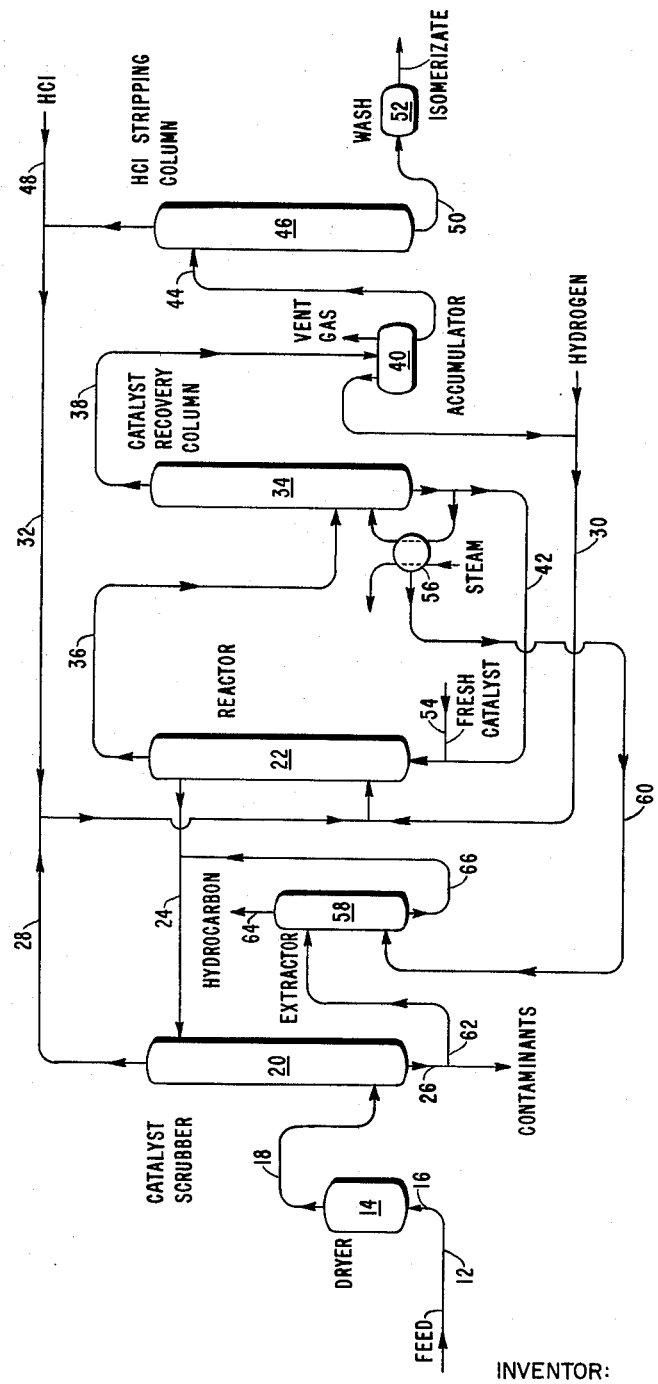

Aug. 17, 1965  E. B. FOUNTAIN  3,201,495
CATALYST RECOVERY USING SLUDGE EXTRACTION
Filed Dec. 13, 1962  2 Sheets-Sheet 1

INVENTOR:
EUGENE B. FOUNTAIN
BY Robert C. Clement
HIS ATTORNEY

INVENTOR:
EUGENE B. FOUNTAIN
BY Robert C. Clement
HIS ATTORNEY

United States Patent Office 3,201,495
Patented Aug. 17, 1965

3,201,495
CATALYST RECOVERY USING SLUDGE EXTRACTION
Eugene B. Fountain, Berkeley, Calif., assignor to Shell Oil Company, New York, N.Y., a corporation of Delaware
Filed Dec. 13, 1962, Ser. No. 244,408
6 Claims. (Cl. 260—683.74)

This invention relates to an improved process for effecting catalytic conversion of hydrocarbons in liquid phase with fluid catalyst. More particularly, this invention relates to the isomerization of saturated hydrocarbons in liquid phase with a catalyst of the molten salt type, especially such as molten salt mixtures comprising metal salts of the Friedel-Crafts type.

The liquid phase isomerization of normal paraffins such as butane is well known and has been incommercial use for many years. The process is described for example in the "Oil and Gas Journal," No. 14, page 151, April 3, 1961.

In the isomerization of normal paraffins with Friedel-Crafts type catalysts, there is formed a catalyst sludge which is insoluble in hydrocarbon and which is retained in the molten catalyst mixture. The sludge is predominantly an organo-aluminum halide complex formed as a result of undesirable side reactions such as the reaction of aluminum chloride with intermediate reaction products or/and impurities such as olefinic and cyclic hydrocarbons in the feed. In addition, minor amounts of inorganic compounds are formed from the reaction of metal halide with traces of water present in the feed. This sludge is separated from active catalytic materials in a scrubbing zone by scrubbing the sludge-containing catalyst with a hydrocarbon stream. Active catalyst components are dissolved in the hydrocarbon stream, such as the isomerization feed, and are generally returned to the reaction zone dissolved in the hydrocarbon. The hydrocarbon-insoluble sludge is withdrawn continuously or periodically from the scrubbing zone.

In the past, commercial isomerization has generally been limited to butane and to a lesser extent, pentane and hexane since the need heretofore, especially during times of war, has been for the production of aviation gasolines. More recently, however, the demand for high octane motor gasolines has created a need for high-octane, low-boiling components such as isopentane and isohexane. Thus, recent emphasis has been on the development of a practical process for isomerizing normal pentane and heavier streams to corresponding isomers for motor gasoline blending.

When isomerizing these higher molecular weight paraffins which are generally only available in hydrocarbon fractions which also contain naphthenes such as methylcyclopentane, a heavy hydrocarbon fraction is produced which cannot be completely separated from the catalyst phase by fractionation in a distillation column generally referred to as a catalyst recovery column. These heavy hydrocarbons accumulate in the reboiler of the catalyst recovery column, usually as a hydrocarbon liquid phase above the catalyst liquid phase. When the heavy hydrocarbons are withdrawn from the column, they contain substantial amounts of catalyst components, primarily dissolved antimony trihalide, which are subsequently lost from the isomerization process. Moreover, the hydrocarbon must be further processed such as by caustic neutralization and water wash before the hydrocarbon can be utilized.

It has now been found in accordance with the present invention that the catalyst components can be recovered from the heavy hydrocarbon fraction withdrawn from the catalyst recovery column by extracting this fraction with sludge. The catalyst components are ultimately recovered from the sludge. In addition, chemical costs associated with caustic neutralization of the hydrocarbon fraction are substantially reduced as a result of the purification of the hydrocarbon fraction. These and further advantages of the invention will be apparent to those skilled in the art from the following detailed description made with reference to the drawing consisting of two figures which are flow diagrams illustrating two preferred embodiments of the process of the invention.

The invention is applicable to the isomerization of $C_5$ and heavier saturate feeds, preferably a $C_5$ to $C_7$ saturate feed, which contains naphthenes. In order to set forth more fully the nature of the invention, without however intending to limit the scope thereof, it will be described in detail as applied to liquid phase isomerization of a $C_5/C_6$ straight-run fraction with an aluminum chloride-antimony trichloride molten salt catalyst.

Referring now to FIGURE 1 of the drawing, the straight-run feed containing paraffins and naphthenes introduced through line 12 enters dryer 14 through line 16. Ancillary equipment such as pumps, compressors, heat exchangers, valves, etc., which are obvious to those skilled in the art are not shown. The dry feed passes through line 18 into the bottom of catalyst scrubber 20 and rises through the scrubber countercurrently to catalyst pumped from reactor 22 through line 24. In this manner, the antimony trichloride and active aluminum chloride in the catalyst phase are dissolved in the feed. The aluminum chloride-hydrocarbon sludge which is insoluble in hydrocarbon, and other contaminants such as corrosion products are removed from the scrubbing zone through line 26. The feed, now containing dissolved catalyst components, is passed to reactor 22 via line 28 together with hydrogen from line 30 and hydrogen chloride from line 32. The reactor can be suitably of the stirred type which has been used in commercial practice but is preferably a vertical tower containing a pool of catalyst such as described in Thomas, U.S. Patent 2,983,775, issued May 9, 1961. The catalyst is a molten salt mixture of antimony trichloride and aluminum chloride in appropriate proportions of about 84 to about 98% by weight antimony trichloride and about 16 to about 2% by weight aluminum chloride.

Temperature in the reaction zone can range from a minimum temperature at which the catalyst can be maintained in the molten state up to approximately 210° F. The isomerization can be carried out at higher temperatures but the low temperatures result in a more desirable yield structure. The pressure in the reaction zone conventionally varies from the pressure required to maintain the $C_5/C_6$ fraction primarily in the liquid phase up to any desired superatmospheric pressure. Pressures from about 120 to about 500 pounds per square inch guage generally are suitable.

The reactor effluent enters catalyst recovery column 34 through line 36. The catalyst recovery column is suitably a conventional fractional distillation column. Vapor pressure of the antimony trichloride and aluminum chloride is quite low; therefore, separation from the $C_5/C_6$ product hydrocarbons, generally referred to as isomerizate, is easily effected. The isomerizate is passed overhead as a vapor phase through line 38, cooled to condense hydrocarbon therein and collected in accumulator 40. A liquid catalyst is removed as column bottoms and is recycled through line 42 to reactor 22. Fresh catalyst can be added to the system through line 54 as necessary to replace catalyst loss in the process.

Hydrogen is withdrawn from overhead accumulator 40, compressed, and recycled through line 30 to reactor 22, as mentioned above. Makeup hydrogen can be added to the system as necessary. Alternatively, it is possible to operate without compression facilities by using oncethrough hydrogen from say a catalytic dehydrogenation unit.

Liquid from accumulator 40 is passed via line 44 to hydrogen chloride stripping column 46. Hydrogen chloride is recovered overhead and recycled through line 32 to reactor 22. Hydrogen chloride can be added to the system as necessary through line 48. The isomerizate is removed as a bottom product through line 50. It is desirable to give the isomerizate a caustic treatment and water wash in vessel 52 to remove any residual hydrogen chloride or traces of catalyst.

A heavy hydrocarbon material is formed by the coupling of naphthenes during the isomerization reaction. This material consists essentially of $C_8$ and $C_{12}$ hydrocarbon boiling in the gasoline range and accumulates in the reboiler section of the catalyst recovery column generally as a separate phase above the catalyst phase.

The heavy hydrocarbon phase, rich in dissolved catalyst components, is removed as a slip-stream from the catalyst recovery column, such as from a reboiler 56, and is introduced into extractor 58 through line 60. The heavy hydrocarbon passes through the scrubber countercurrently to sludge which is introduced through line 62 from catalyst scrubber 20. In the extraction, catalyst components are extracted from the heavy hydrocarbons by the sludge. Extraction of catalyst components from the heavy hydrocarbon material can be done in a batch extractor. It is preferred that the extraction be carried out in a continuous countercurrent extractor.

Substantial quantities of catalyst components are recovered from the heavy hydrocarbon stream in only one extraction stage. However, it is desirable to have at least 2 extraction stages, preferably 3 extraction stages, in the extractor. The advantages of staging are seen from the data set forth in Table I wherein a heavy hydrocarbon material containing 33.3% weight antimony trichloride withdrawn from the reboiler of the catalyst recovery column in a $C_5/C_6$ isomerization process is countercurrently extracted at 180° F. with (1) 1 part by weight sludge and (2) ½ part by weight sludge.

TABLE I

*Countercurrent scrubbing of heavy hydrocarbon with sludge*

| Extraction Stage | Amount of Antimony Trichloride in Hydrocarbon Raffinate, Percent w. | |
|---|---|---|
| | Scrubbed with One Part by Weight Sludge | Scrubbed with One-half Part by Weight Sludge |
| First Stage | 0.78 | 0.87 |
| Second Stage | 0.18 | 0.47 |
| Third Stage | 0.06 | 0.09 |

It is evident that substantial quantities of antimony trichloride are removed from the heavy hydrocarbon stream with only one extraction stage and substantially all of the antimony trichloride is recovered from the heavy hydrocarbon stream in three extraction stages.

The weight ratio of sludge to hydrocarbon in the extraction process can be from about 5:1 to about 1:5, preferably from about 1:1 to about 1:2.

The temperature in the hydrocarbon scrubber is from about 90° F. to about 250° F. preferably from about 140° F. to about 210° F.

Heavy hydrocarbon substantially free from catalyst components is withdrawn from the extractor via line 64 and is preferably caustic and water washed to remove traces of catalyst components. If desired, the heavy hydrocarbon material can be routed to the isomerizate in line 50 before that stream is caustic and water washed. In this manner, separate caustic wash facilities are not required and the heavy hydrocarbons are conveniently routed to gasoline blending. If desired, the recovered heavy hydrocarbons can also be used in special product manufacture or in turbine fuel.

The sludge stream, enriched in catalyst, is withdrawn from extractor 58 and is returned to catalyst scrubber 20 through line 66 wherein the catalyst components are subsequently dissolved in the feed stream and returned to the isomerization zone.

Figure 2:
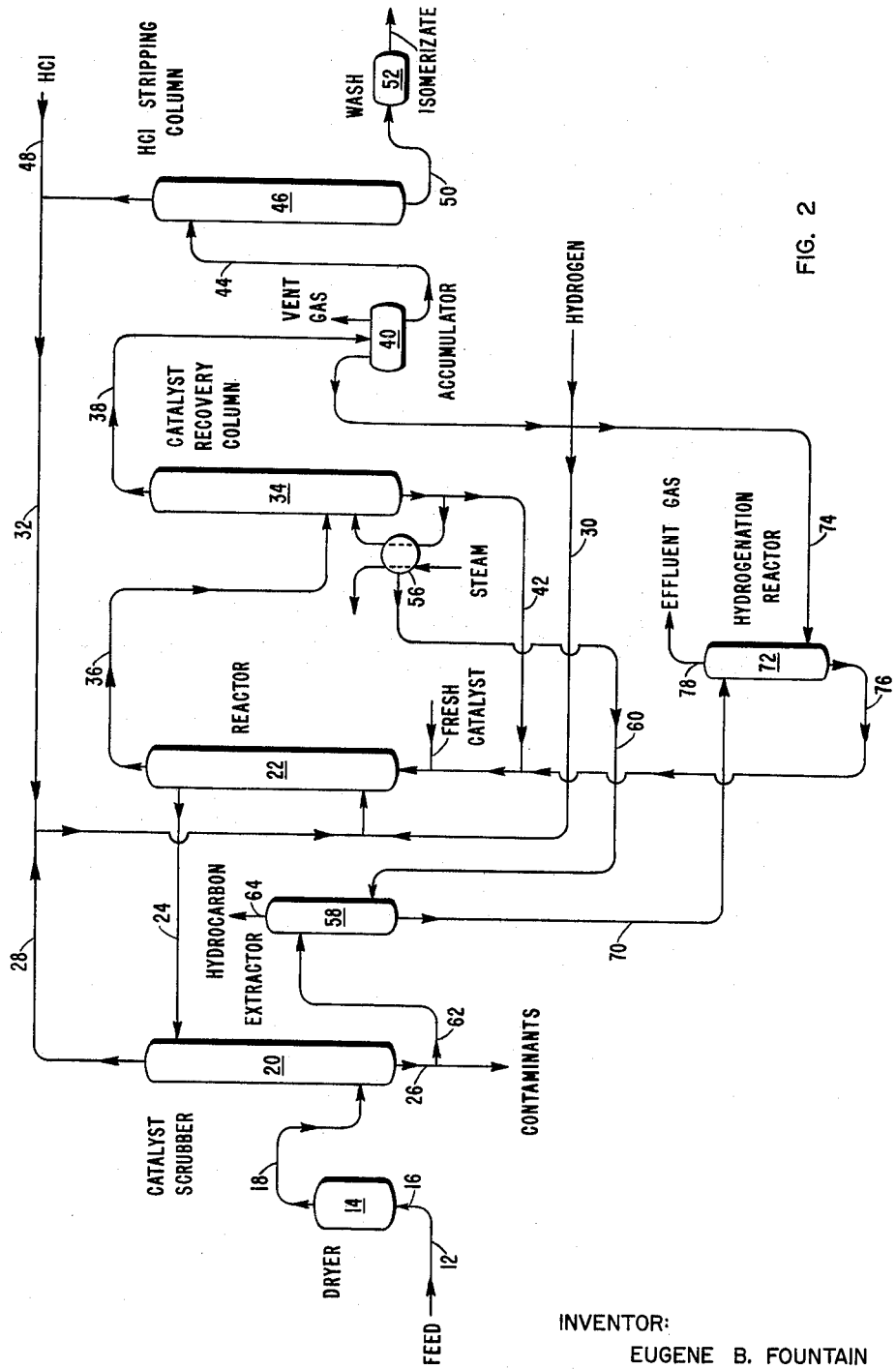

In another preferred embodiment of the invention as illustrated by FIGURE 2 of the drawing, the sludge stream enriched in catalyst components can be routed via line 70 to hydrogenation reactor 72 wherein the sludge is contacted with reaction gas consisting of hydrogen and preferably hydrogen halide under hydrogenation conditions to decompose the sludge and release catalyst components. The reaction gas can be obtained from any suitable source, preferably from circulating gas in the isomerization process, and is introduced into reactor 72 via line 74. Suitable and exemplary hydrogenation conditions for converting the sludge to catalyst are set forth in detail in copending U.S. patent application to William E. Ross, Serial No. 203,050, filed June 18, 1962 now abandoned. Recovered catalyst components can be returned to the isomerization process via line 76. Effluent gas is withdrawn from reactor 72 and can be routed for example to refinery fuel after neutralization of acid gas or can be returned to the isomerization process.

The following example is illustrative of some of the advantages derived from the invention but is not to be considered to limit the scope of the invention.

*Example 1*

A $C_5/C_6$ paraffin feed stock containing 25% w. of $C_6$ naphthenes was isomerized using aluminum chloride catalyst in admixture with antimony trichloride at 185° F. reactor temperature, 250 p.s.i.g. reactor pressure, 5–6% weight hydrogen chloride as a promoter and 3% m. hydrogen as a cracking inhibitor. A heavy hydrocarbon material accumulated in the reboiler of the catalyst recovery column. This hydrocarbon, containing 10% by weight antimony trichloride, was withdrawn from the reboiler of the catalyst recovery column and was contacted at 175° F. with ½ part by weight sludge, followed by a second contacting with 1 part by weight of a different batch of sludge. An analysis of the heavy hydrocarbon stream recovered from the second contacting indicated an antimony trichloride content of only 0.14% weight. This two-stage batch extraction process resulted in the recovery of over 98% by weight antimony trichloride from the hydrocarbon stream.

I claim as my invention:

1. In an isomerization process wherein normal paraffins and naphthenes are contacted in a reaction zone with a molten salt catalyst comprising aluminum halide and antimony trihalide, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge, withdrawing from the extraction zone liquid hydrocarbon substantially reduced in concentration of a catalyst components and sludge enriched in a catalyst component and passing the enriched sludge into the scrubbing zone wherein the catalyst is separated from the sludge.

2. In an isomerization process wherein normal paraffins and naphthenes are contacted in a reaction zone with a molten salt catalyst comprising aluminum halide and antimony trihalide, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge, withdrawing from the extraction zone liquid hydrocarbon substantially reduced in catalyst components and sludge enriched in catalyst components, passing the enriched sludge into a hydrogenation zone, contacting the sludge with hydrogen under hydrogenation conditions to decompose the sludge and release catalyst components, and using the recovered catalyst components for the isomerization of further quantities of normal paraffins.

3. In an isomerization process wherein normal paraffins and naphthenes are contacted in a reaction zone with a molten salt catalyst comprising aluminum halide and antimony trihalide, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge, withdrawing from the extraction zone liquid hydrocarbon substantially reduced in catalyst components and sludge enriched in catalyst components, passing the enriched sludge to a hydrogenation zone, contacting the sludge with hydrogen and hydrogen halide under hydrogenation conditions to decompose the sludge and release catalyst components and using the recovered catalyst components for the isomerization of further quantities of normal paraffins.

4. In an isomerization process wherein a hydrocarbon fraction containing normal paraffins and naphthenes is contacted in a reaction zone with hydrogen halide and molten salt catalyst comprising aluminum halide and antimony trihalide, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge and withdrawing from the extraction zone liquid hydrocarbon substantially reduced in concentration of catalyst components and sludge enriched in catalyst components.

5. In an isomerization process wherein a hydrocarbon fraction containing normal paraffins and naphthenes is contacted in a reaction zone with hydrogen, hydrogen halide and a molten salt catalyst comprising aluminum halide and antimony trihalide, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge and withdrawing from the extraction zone liquid hydrocarbon substantially reduced in concentration of catalyst components and sludge enriched in catalyst components.

6. In an isomerization process wherein a hydrocarbon fraction containing normal paraffins and naphthenes is contacted in a reaction zone with hydrogen, hydrogen chloride and molten salt catalyst comprising aluminum chloride and antimony trichloride, a portion of the catalyst being deactivated to a hydrocarbon-insoluble sludge which is separated from active catalyst by scrubbing with hydrocarbon in a scrubbing zone, and reaction zone effluent being separated in a fractionation zone into a vaporous phase containing isomerization product, a liquid hydrocarbon phase containing catalyst components, and a liquid catalyst phase, the improvement which comprises contacting the liquid hydrocarbon phase from the fractionation zone in an extraction zone with sludge, withdrawing from the extraction zone liquid hydrocarbon substantially reduced in catalyst components and sludge enriched in catalyst components, passing the enriched sludge into a hydrogenation zone, contacting the sludge with hydrogen and hydrogen chloride under hydrogenation conditions to decompose the sludge and release catalyst components and using the recovered catalyst components for the isomerization of further quantities of normal paraffins.

References Cited by the Examiner

UNITED STATES PATENTS

| | | | |
|---|---|---|---|
| 2,293,891 | 8/42 | Evering et al. | 208—13 |
| 2,394,797 | 2/46 | McAllister et al. | 260—683.75 |
| 2,983,775 | 5/61 | Thomas | 260—683.75 |

ALPHONSO D. SULLIVAN, *Primary Examiner.*